United States Patent
Jones

(10) Patent No.: US 6,980,601 B2
(45) Date of Patent: Dec. 27, 2005

(54) RATE ADAPTATION AND PARAMETER OPTIMIZATION FOR MULTI-BAND SINGLE CARRIER TRANSMISSION

(75) Inventor: David Charles Jones, Louisville, CO (US)

(73) Assignee: Broadcom Corporation, Irvine, CA (US)

( * ) Notice: Subject to any disclaimer, the term of this patent is extended or adjusted under 35 U.S.C. 154(b) by 861 days.

(21) Appl. No.: 09/888,242

(22) Filed: Jun. 22, 2001

(65) Prior Publication Data

US 2002/0106010 A1    Aug. 8, 2002

Related U.S. Application Data

(60) Provisional application No. 60/249,475, filed on Nov. 17, 2000.

(51) Int. Cl.⁷ .............................................. H04L 5/12
(52) U.S. Cl. .................................................. 375/261
(58) Field of Search ................................ 375/219, 220, 375/222, 223, 259, 261, 265, 285, 298; 370/252, 370/468; 329/304; 332/103

(56) References Cited

U.S. PATENT DOCUMENTS

| | | | |
|---|---|---|---|
| 5,359,593 A | 10/1994 | Derby et al. ................... 370/17 |
| 5,479,447 A | 12/1995 | Chow et al. ................. 375/260 |
| 5,598,435 A | 1/1997 | Williams .................... 375/261 |
| 5,987,069 A | 11/1999 | Furukawa et al. .......... 375/285 |
| 6,072,779 A | 6/2000 | Tzannes et al. ............. 370/252 |
| 6,088,387 A | 7/2000 | Gelblum et al. ............ 375/222 |
| 6,101,223 A | 8/2000 | Betts ........................... 375/261 |
| 6,175,550 B1 * | 1/2001 | van Nee ...................... 370/206 |
| 6,327,311 B1 * | 12/2001 | Ojard .......................... 375/261 |

FOREIGN PATENT DOCUMENTS

| | | |
|---|---|---|
| EP | 0 753 947 | 1/1997 |
| EP | 0 812 087 | 12/1997 |
| EP | 0 869 647 | 10/1998 |
| GB | 2 285 375 | 7/1995 |
| WO | WO 95/28773 | 10/1995 |
| WO | WO 97/37454 | 10/1997 |
| WO | WO 98/57472 | 12/1998 |

* cited by examiner

Primary Examiner—Don N. Vo
(74) Attorney, Agent, or Firm—Christie, Parker & Hale, LLP

(57) ABSTRACT

A method for enhancing the bit rate and/or margin at which quadrature amplitude modulation (QAM) communication is performed over multiple bands of a communication link includes the steps of varying a spectral allocation and constellation size with which communication is performed, so as to define a combination of spectral allocation and constellation size at which the bit rate and/or margin are enhanced. The rate adaptation method identifies the spectral allocation and constellation size to use on each of the multiple bands that results in a total bit rate greater than or equal to the target bit rate, subject to specified constraints on SNR margin and/or BER limits. If more than one parameter set has this property, the rate adaptation method may for example select the spectral allocation and constellation size combination that maximizes the minimum SNR margin across the multiple bands.

24 Claims, 9 Drawing Sheets

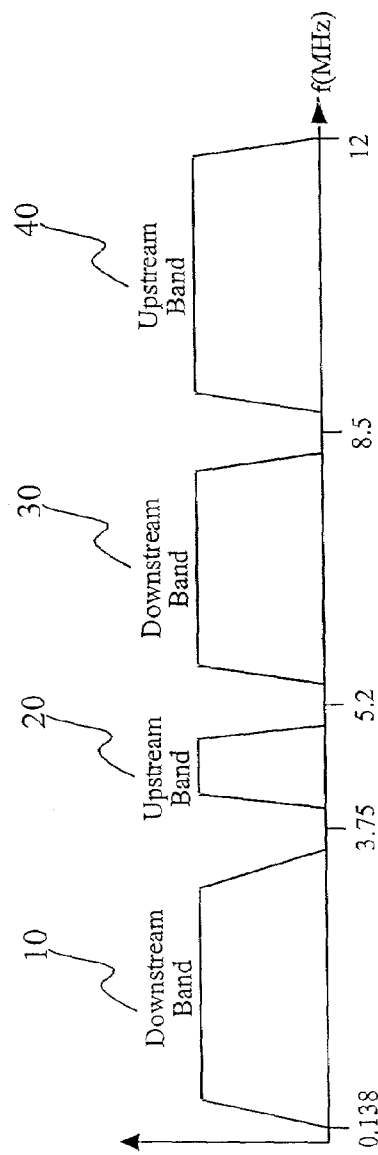
FIG. 1: Example VDSL Spectral Plan
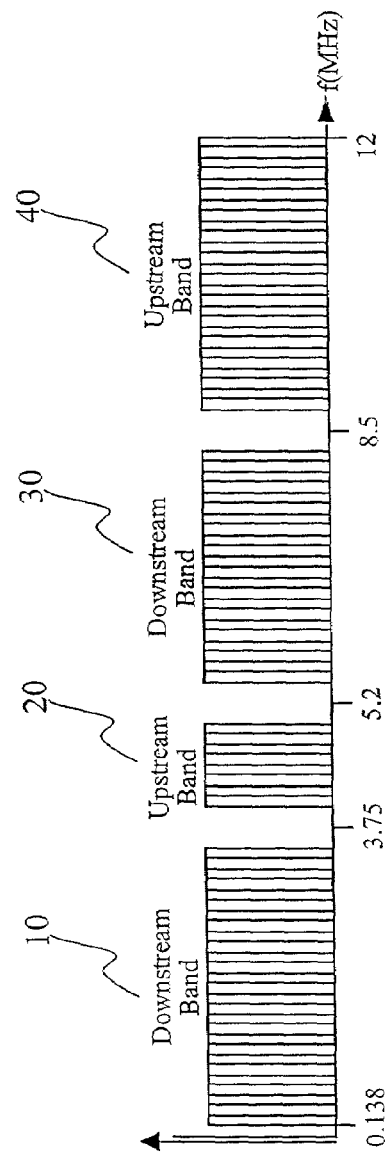
FIG. 2: Multi-Carrier Modulation Implementation of Example VDSL Spectral Plan

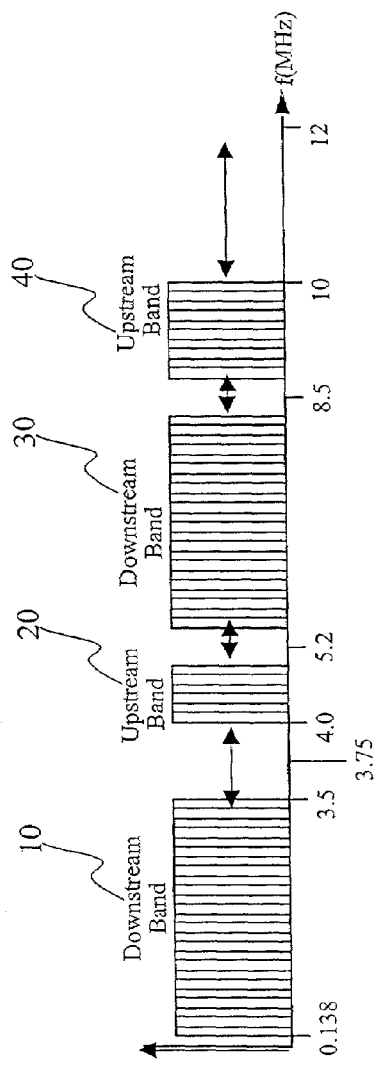
FIG. 3: Adjustment of Total Bandwidth in an MCM System
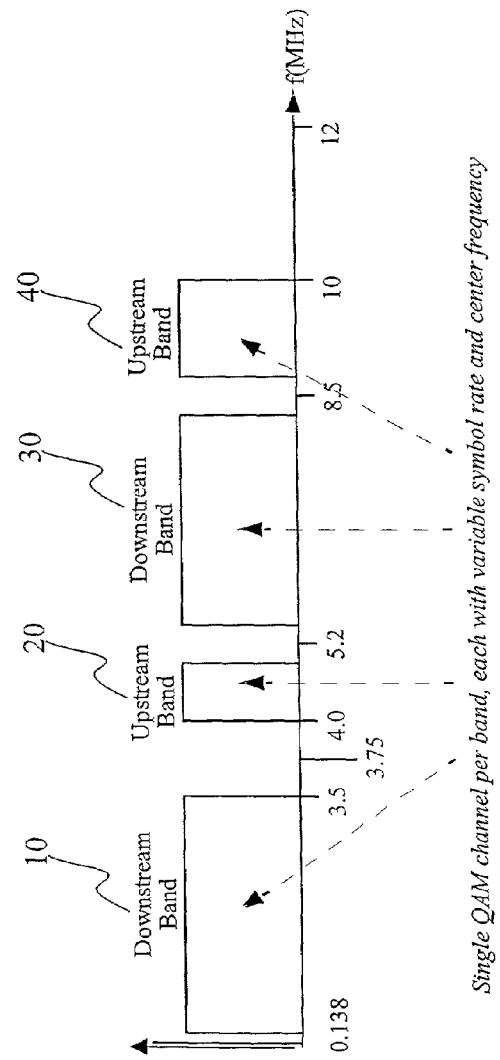
*Single QAM channel per band, each with variable symbol rate and center frequency*
FIG. 4: Adjustment of Total Bandwidth in a SCM System

RATE ADAPTATION AND PARAMETER OPTIMIZATION FOR MULTI-BAND SINGLE CARRIER TRANSMISSION

CROSS-REFERENCE TO RELATED APPLICATION(S)

This application claims the benefit of U.S. provisional patent application 60/249,475, filed Nov. 17, 2000, the content of which are hereby incorporated by reference.

FIELD OF THE INVENTION

The present invention relates generally to electronic communications systems. The present invention relates more particularly to an apparatus and method for providing digital communications via twisted pair telephone lines in digital subscriber line (DSL) systems.

BACKGROUND

Modern communication systems often have a capacity formed from the aggregation of multiple transmission bands. For example, a very high speed digital subscriber line (VDSL) comprises an upstream link (i.e., from subscriber to network) and a downstream link (i.e., from network to subscriber). Each of the links in a VDSL communication system are commonly implemented with two CAP/QAM bands as shown in FIG. 1. Hence VDSL downstream or VDSL upstream links often have two transmission bands 10, 30 and 20 and 40 respectively.

However, due to the dispersive nature of twisted copper pair, severe channel attenuation as well as intersymbol interference (ISI) are unavoidable in VDSL applications. To mitigate the effects of ISI, some sophisticated form of equalization is often necessary. Furthermore, the VDSL environment consists of a wide variety of loop configurations; as a result, the optimal transmission bandwidth of one particular line may be grossly mismatched to that of another line. Therefore, typical VDSL networks optimize the transmission bandwidth on a line-by-line basis.

In a conventional single-carrier digital transmission system, such as a Quadrature Amplitude Modulation (QAM) system, implemented with an equalizer or a precoder, the transmission bandwidth is determined by the symbol rate and the carrier frequency of the system. Alternatively, some DSL systems, such as for example, ADSL often use a technology that is referred to alternately as Multi-Carrier Modulation (MCM), multi-tone, Discrete Multi-Tone (DMT), and Orthogonal Frequency Domain Multiplexing (OFDM). Hereinafter these techniques will be collectively referred to by the single name Multi-Carrier Modulation (MCM).

Referring to FIG. 2, MCM systems typically divide the individual transmission bands into a relatively large number of narrowband subchannels, with each subchannel carrying a separate QAM signal with fixed symbol rate and center frequency. In a typical MCM system each of the four bands for VDSL are filled with a large number of narrowband subchannel signals, where each subchannel signal has a fixed symbol rate and center frequency and therefore a fixed bandwidth. FIG. 2 depicts the individual narrowband subchannels as not overlapping, but in reality some overlap may occur. The resulting contamination from one subchannel into adjacent subchannels may be reduced by a combination of equalization and orthogonalization techniques.

The number of subchannels used by MCM techniques is usually much larger than can be clearly depicted in a graphical illustration such as FIG. 2. Standard proposals for MCM-based VDSL systems typically feature subchannels that are approximately 4.3125 kHz wide. This means that the number of subchannels used to implement a MCM VDSL system with a total bandwidth of 12 MHz is approximately 2782.

In an MCM system, the total bandwidth used in each band can be adjusted by varying the number of subchannels that are active. For example, referring to FIG. 3 the first downstream band 10, that ranges in frequency from 0.138 MHz–3.75 MHz, has all of its corresponding subchannels activated except those in the range of 3.5 MHz–3.75 MHz]. This may sometimes be done in VDSL to avoid interference with an amateur radio band which operates in the [3.5 MHz, 4.0 MHz] region of off-air spectrum. Similarly, the subchannels occupying the 3.75 MHz–4.0 MHz region of the first upstream band 20 may also be disabled. In addition, for this example the subchannels near the transition frequency (5.2 MHz) of the first upstream band 20 may be disabled to simplify the circuitry that duplexes upstream and downstream bands onto a single copper twisted pair. Disabling subchannels near the band transition frequency allows the use of analog filters that protect the receiver Analog-to-Digital Converter (ADC) from echo and distortion caused by the local downstream transmitter.

For this example subchannels in the second downstream band 30 and the second upstream band 40 near the band transition frequencies of 5.2 MHz and 8.5 MHz may also disabled, again to allow for analog filters which can assist in the duplexing of upstream and downstream signals onto a single twisted pair. In addition, in this example, the second upstream band 40 stops transmission at 10 MHz by disabling subchannels located above 10 MHz in frequency. Typically, high frequency subchannels are disable when the twisted pair is of sufficient length that no transmission capacity is available at frequencies higher than 10 MHz. Disabling subchannels above 10 MHz in this case saves transmitter power without reducing the overall throughput available.

As shown by this example, MCM systems can modify the transmission spectrum by enabling certain subchannels and disabling the rest. In addition, some MCM systems can vary the signal constellations used on each individual subchannel. In order to achieve good transmission performance on twisted pair channels, MCM DSL transceivers typically implement algorithms that determine which subchannels are enabled, and which constellation to use on each of these active subchannels. Numerous approaches exist for accomplishing these two steps. Each of the conventional approaches assume the use of MCM modulation with its inherent fixed-bandwidth subchannels, and that overall bandwidth adjustment is therefore performed simply by deciding which subchannels to enable and which to disable. This is in fundamental contrast with single carrier modulation (SCM) systems. By definition, SCM systems contain only a single QAM channel per band. For example, a SCM implementation of the example VDSL spectral plan of FIG. 1 comprises four QAM signals, one for each of the four bands shown. By contrast, as already pointed out a MCM implementation of this spectral plan typically will require the use of approximately 2782 QAM subchannels, with hundreds of QAM subchannels dedicated to each of the four bands of FIG. 2.

Because there is only a single QAM channel per band in a SCM system, it is not possible to vary the overall frequency range used within each band by enabling and disabling certain subchannels. As a result, MCM techniques for bandwidth optimization cannot be applied to a SCM system. Instead, what is needed in SCM systems is a facility for varying the symbol rate and center frequency of the single QAM signal per band. With such a facility in place a SCM system can generate a desired overall signal spectra, e.g. one matching that of the MCM system in FIG. 3, but through means of only a single QAM channel per band, as shown FIG. 4. In addition, for optimal performance across a wide variety of twisted pair channels and across differing noise environments, an algorithm is needed to select specific values for these parameters.

SUMMARY OF THE INVENTION

In one aspect of the present invention a method for multi-band, bidirectional data communication over a non-ideal channel includes the steps of defining a total target bit rate for the multiple bands, defining a margin requirement for each of the multiple bands, evaluating a response characteristic of each of the multiple bands and defining a combination of spectral allocation and constellation size at which the bit rate and/or margin is enhanced in accordance with the response characteristic.

BRIEF DESCRIPTION OF THE DRAWINGS

These and other features, aspects, and advantages of the present invention will become better understood with regard to the following description, appended claims, and accompanying drawings, in which:

FIG. 1 is a graphical illustration of a VDSL spectral plan in accordance with an exemplary embodiment of the present invention;

FIG. 2 is a graphical illustration of a Multi-Carrier Modulation Implementation of the VDSL spectral plan of FIG. 1;

FIG. 3 is a graphical illustration of a method for adjusting the total bandwidth of a multi-carrier modulation implementation;

FIG. 4 is a graphical illustration of a method for adjusting the total bandwidth of a single carrier modulation implementation in accordance with an exemplary embodiment of the present invention;

DETAILED DESCRIPTION OF THE INVENTION

An exemplary embodiment of the present invention provides a method and apparatus for selecting an optimum parameter set, comprising the symbol rate, center frequency and constellation, for use in each of multiple transmission bands (B). In an exemplary embodiment, each of the multiple bands carries a single carrier CAP/QAM signal with adjustable symbol rate, center frequency, and constellation.

While the present invention is open to various modifications and alternative constructions, it will be beneficial to describe the invention in the context of an exemplary DSL transceiver. It is to be understood, however, that there is no intention to limit the invention to the particular forms disclosed. On the contrary, it is intended that the invention cover all modifications, equivalences and alternative constructions falling within the spirit and scope of the invention as expressed in the appended claims.

Figure 5:
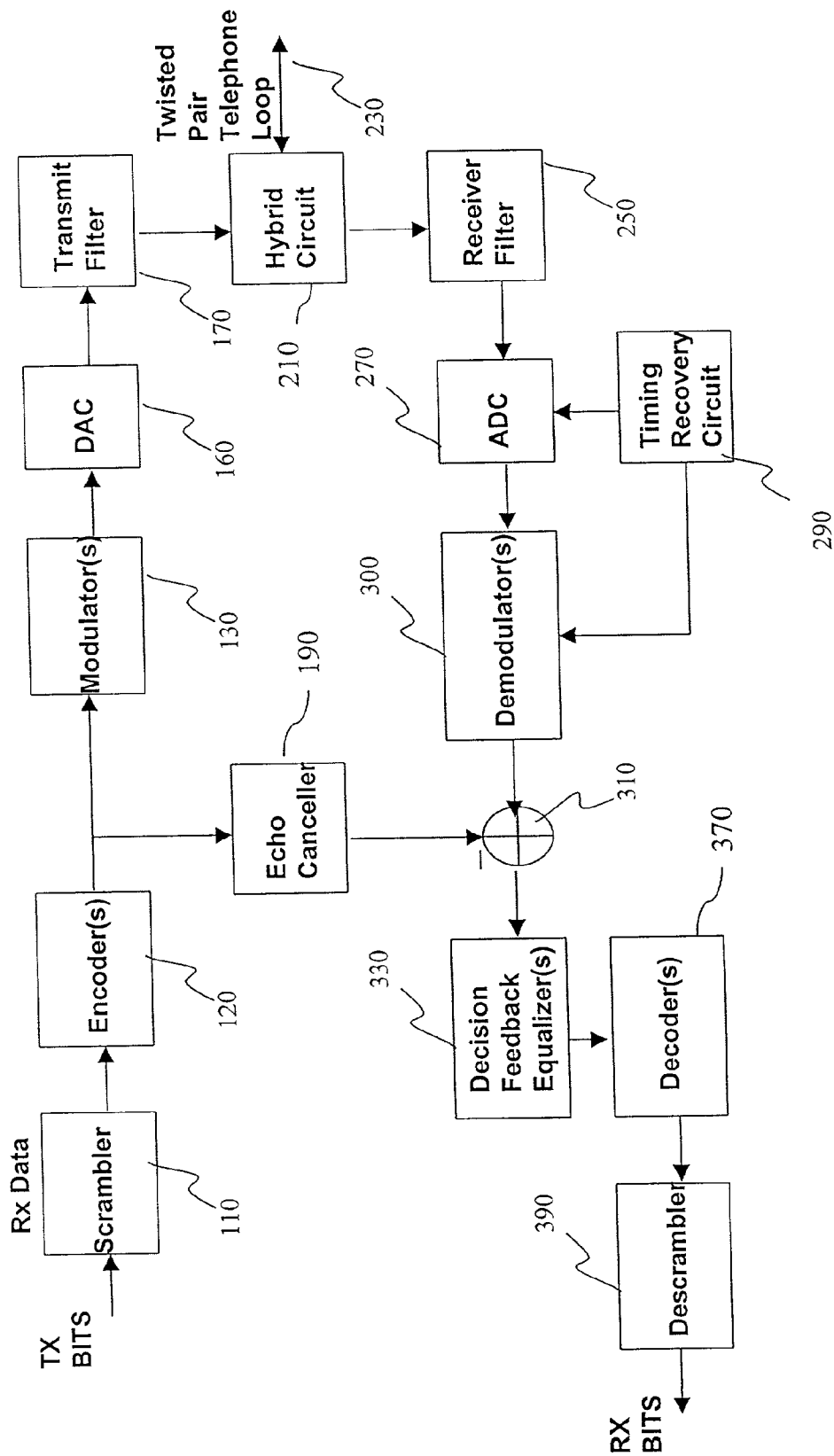
FIG. 5 is a simplified block diagram of a contemporary DSL transceiver according to the prior art.

Referring now to FIG. 5, a contemporary DSL transceiver incorporates a scrambler 110 that intermixes an incoming digital data stream so as to prevent the transmission of long streams of zeros or ones, which tend to make synchronization difficult. The use of a scrambler 110 may, in some instances, make the subsequent coding process more efficient.

An encoder 120 applies optional forward error correction (FEC) and maps the resulting data into QAM symbols. A modulator 130 represents these symbols in a form suitable for transmission through the channel, utilizing quadrature amplitude modulation (QAM) with a fixed bandwidth, center frequency, and constellation size. For example, the encoder 120 may utilize a 256 point constellation to encode each symbol with 8 bits of data (although the use of Trellis and/or Reed-Solomon FEC coding may reduce the actual average number of payload data bits encoded into each symbol, as redundant bits which facilitate forward error correction (FEC) are added). The modulator 130 outputs samples of the modulated waveform to a digital to analog converter (DAC) 160, which optionally contains a pulse shaping function to assure that the pulses output thereby are well defined.

One of skill in the art will appreciate that for the case where transmission in a given direction is to occur on more than one band, as is illustrated in FIG. 1, multiple encoders and modulators are employed, one for each of the transmit bands, with each processing a portion of the total transmit bit stream output by the scrambler.

The analog signal output by the DAC 160 is provided to transmit filter 170, which typically includes a low pass filter that removes undesirable high frequency components generated by the DAC 160. In this manner, the transmit filter 170 reduces undesirable out-of-band energy. A hybrid circuit 210 facilitates full duplex-type communications over a twisted pair telephone loop 230. In the case where the transceiver is transmitting, the hybrid circuit 210 inhibits undesirable introduction of the transmitted communication signals back into a receiver filter 250 of the transceiver, while permitting transmission of the communication signals to the twisted pair telephone loop 230. In the case where the transceiver is receiving a communication signal, the hybrid circuit 210 routes the communication signal to the receiver filter 250. Thus, the hybrid circuit 210 is capable of separating the downstream channel from the upstream channel and routing the intelligence present on each channel to its intended destination. The receiver filter 250 is typically a low pass filter that mitigates the undesirable presence of out-of-band noise in a manner similar to that described in connection with transmit filter 170.

Analog to digital converter (ADC) 270 converts the received analog signal to digital form for further processing. Typically, preamplification is necessary so as to bring the received signal to the voltage level required by the analog to digital converter 270. The analog to digital converter 270 may be synchronized to timing recovery circuit 290, which facilitates synchronization of two communicating transceivers. Recovered timing is also applied to demodulator 300, which converts the modulated waveform back to (noisy and distorted) QAM symbols.

Encoded symbols, which are directed to the modulator 130 by the encoder 120, are also provided to an echo canceler 190 which generates an echo signal characterized by the transmission medium. The echo canceler 190 is constructed so as to mimic the echo path commonly found to exist between two bi-directionally communicating transceivers, and is commonly characterized as including the transmit filter, the hybrid circuit, the receiver filter, and the analog to digital converter, as well as the transmission medium. The sampling rate of the encoder 120 is synchronized to analog to digital sampling clock 270, so as to maintain a stable echo path transfer function.

A summer 310 facilitates the removal of a substantial portion of the actual echo from the output of the demodulator 300 by subtracting the generated echo signal output of the echo canceler 190 from the received signal. As those skilled in the art will appreciate, echos result from impedance mismatches such as those caused by bridged taps, which are common in the public switched telephone network (PSTN).

After the received signal has been digitized by the analog-to-digital converter 270, shifted to baseband (demodulated) by the demodulator 300, and had a substantial portion of the echo component thereof removed by the summer 310 in combination with the echo canceller, the received signal is filtered and equalized by decision feedback equalizer 330. The equalized QAM symbol sequence is converted back into a representation of the original scrambled information bit stream by a decoder 370. Descrambler 390 reverses the scrambling process provided by scrambler 110, so as to reconstruct the original data stream.

One of skill in the art will appreciate that for the case where signal reception in a given direction occurs on more that one band, as illustrated in FIG. 1, multiple demodulators, decision feedback equalizers and decoders are employed, one for each of the receive bands with each contributing a portion of the receive scrambled bit stream input to the descrambler.

According to this example of a contemporary DSL transceiver, symbol rate, transmission center frequency and constellation size are all pre-defined and "built-in" to the operational parameters of any given transceiver optimized for a specific communication application. In the conventional model, as exemplified by the prior art, no attempt is made to optimize symbol rate, center frequency and constellation size for more efficient bandwidth utilization or bit rate enhancement.

Figure 6:
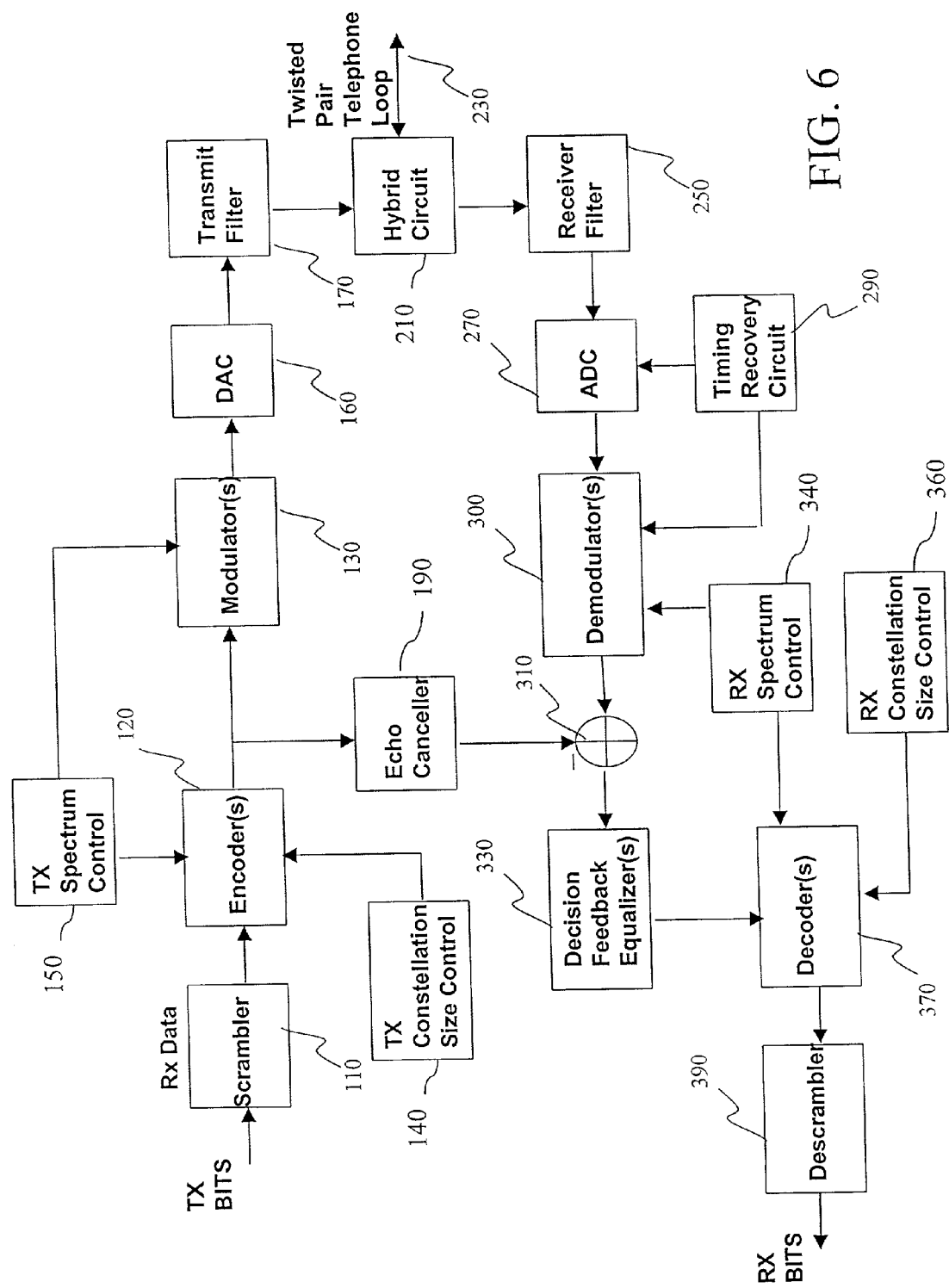
FIG. 6 is a block diagram of an exemplary DSL transceiver having variable spectral allocation and constellation size in accordance with an exemplary embodiment of the present invention.

Referring now to FIG. 6, an exemplary embodiment of a transceiver circuit, suitable for practice of principles of the present invention, is illustrated in simplified block diagram form. In the figure, functional blocks similar to those of the exemplary prior art embodiment of FIG. 5 are identified with like reference numerals. In the exemplary transceiver, and according to the present invention, the symbol rate, center frequency and constellation size of communicated intelligence signals are optimized so as to promote digital communication at an enhanced bit rate and/or noise margin. The symbol rate, which is equivalent to the bandwidth over which the communication takes place, and the communication spectrum center frequency are controlled by a transmit spectrum control circuit 150, coupled to the encoder 120 and modulator 130, and a receive spectrum control circuit 340, coupled to the demodulator 300 and decoder 370. Transmit spectrum control circuit 150 controls the symbol rate utilized by encoder 120 and the center frequency utilized by modulator 130 during the encoding and modulation processes. Similarly, receive spectrum control circuit 340 controls the symbol rate utilized by decoder 370 and the center frequency utilized by demodulator 300.

Transmit constellation size control circuitry 140, coupled to the encoder 120, facilitates varying the constellation size utilized by encoder 120, to values in the range of from about a constellation size of 2 to about a constellation size of 256. Receive constellation control circuitry 360, coupled to the decoder 370, facilitates varying the constellation size utilized by decoder 370, to a similar constellation size range of between 2 and 256. Denser constellations (those with values exceeding 256) may also be supported using the techniques described below, as are constellations having values not equal to a power of 2 (i.e., fractional bit constellations).

As described in detail below, methods for determining efficient combinations of spectral allocation and constellation size are defined which provide communication at an enhanced bit rate and/or margin across multiple bands in a communication link. Spectral allocation may be varied by simultaneously varying center frequency and symbol rate. Thus, the invention provides a method for dynamically optimizing symbol rate, center frequency and constellation size so as to provide digital communication at an enhanced bit rate and/or margin for use in applications such as, for example very high bit rate digital subscriber line (VDSL) systems having multiple bands for the upstream and/or downstream links.

In operation the network or system operator provides a minimum acceptable SNR margin $M_{REQ}$ for each band of a given link. The operator also provides a target aggregate bit rate $\rho$ for the given link, wherein the target aggregate bit rate is equal to the sum of the bit rates achieved in each of the multiple bands that constitute that given link. Under certain conditions it is possible that one or more combinations of parameter sets across the multiple bands will yield a total bit rate greater than or essentially equal to the target bit rate $\rho$ while also possessing a SNR margin in each of the B bands that equals or exceeds the minimum margin requirement $M_{REQ}$. In these instances the described exemplary embodiment selects the parameter set that provides the largest minimum SNR margin across all of the multiple bands as the optimum parameter set. Otherwise, the described exemplary embodiment identifies as optimum the parameter set that maximizes the total bit rate delivered across the multiple bands, subject to the constraint that the SNR margin on each of the multiple bands (B) is greater than or equal to the specified minimum margin requirement $M_{REQ}$.

Previous rate adaptation methods typically assume that both the upstream and downstream links are individually implemented with single SCM bands. For example, commonly owned, co-pending U.S. patent application Ser. No. 09/309,340, (the '340 application), filed May 11, 1999 discloses a DSL rate adaptation method for selecting specific values across a wide variety of twisted pair channels and across differing noise environments. However, referring back to FIG. 1, many modern VDSL communication systems utilize upstream and downstream links comprising two frequency bands per link rather than one. Theoretically, the performance of a rate adaptation method for a multiple band systems may be optimized by specifying separate target bit rates and minimum SNR margin requirements for each frequency band within a given link, and running conventional adaptation algorithms separately upon each of the two bands.

However, for many situations this approach may not result in the selection of the optimum parameter set. In principle, a network operator may not desire separate target bit rates for each band in a multiple band link. Rather, network operators may desire a particular total bit rate for the link that is equal to the aggregate capacity across all of the multiple bands. For example, a network operator may desire 22 Mbps on a two band downstream link to an individual subscriber. In accordance with conventional rate adaptation methods the operator may specify a target bit rate of 18 Mbps for the first downstream band and 4 Mbps for the second downstream band. The operator would also specify separate minimum SNR margin requirements, that may or may not be equal, for each of the two downstream bands.

However, such an approach may not constitute the optimal algorithm for multi-band operation. For example, assume that the first and second downstream bands may also be configured with parameters that yield 19 Mbps and 3 Mbps respectively. Further, assume that this configuration provides a SNR margin on one or both of the bands that is greater than that for the 18 Mbps and 4 Mbps configuration. In this instance system performance would be improved if the operator had specified target bit rates of 19 Mbps and 3 Mbps for the first and second downstream bands respectively since this combination delivers a greater SNR margin and therefore more robust performance in actual field conditions. However, previous systems do not deliver information a priori on what individual bit rate targets should be applied to optimally arrive at a desired overall aggregate bit rate.

Similarly, the desired total bit rate may not be achieved if an operator specifies target bit rates for each band within a multiple band link. For example, if the operator specifies target bit rates of 18 Mbps and 4 Mbps, in hopes of achieving a total bit rate of 22 Mbps, it might be the case that the first downstream band can deliver a maximum of 19 Mbps and the second downstream band can deliver a maximum of 3 Mbps, both subject to the minimum SNR margin requirement. In such a case conventional optimization algorithms that individually optimize each band would deliver 18 Mbps for the first downstream band and 3 Mbps for the second downstream band, thus failing to achieve the total target bit rate. In this instance the total target bit rate of 22 Mbps would have been achieved subject to the minimum SNR margin requirements had the operator specified target bit rates of 19 Mbps and 3 Mbps for the first and second downstream bands.

An exemplary embodiment of the present invention addresses the shortcomings of conventional bit rate optimization techniques as applied to multiple band links. The described exemplary embodiment utilizes a single aggregate target bit rate, and a single minimum SNR margin constraint rather than utilizing separate bit rate targets and minimum SNR margin requirements for each of the bands within a link. The present invention then jointly optimizes the (symbol rate, center frequency, constellation) parameter set for each band in order to deliver the globally optimal performance for the given twisted pair channel and noise environment.

While FIG. 1 shows both the upstream and downstream links implemented with two bands, communication systems may be implemented with even more bands per link. Indeed, VDSL specifications already include an optional third upstream band (at 25 kHz–138 kHz), and additional bands may be added in the future above 12 MHz. One of skill in the art will therefore appreciate that the present invention is not limited in application to VDSL systems, or to systems comprising a two-band link. Rather, the present invention may be utilized to provide optimum rate adaptation in any SCM link consisting of any number of bands. This is reflected in the fact that an exemplary rate adaptation method optimizes the parameter set for a link comprising multiple bands (B), where B is any positive integer. The present invention may be utilized in systems having one or more links, in which each of the links is composed of an arbitrary number of bands, and in which each band is implemented by a single SCM channel.

Figure 7:
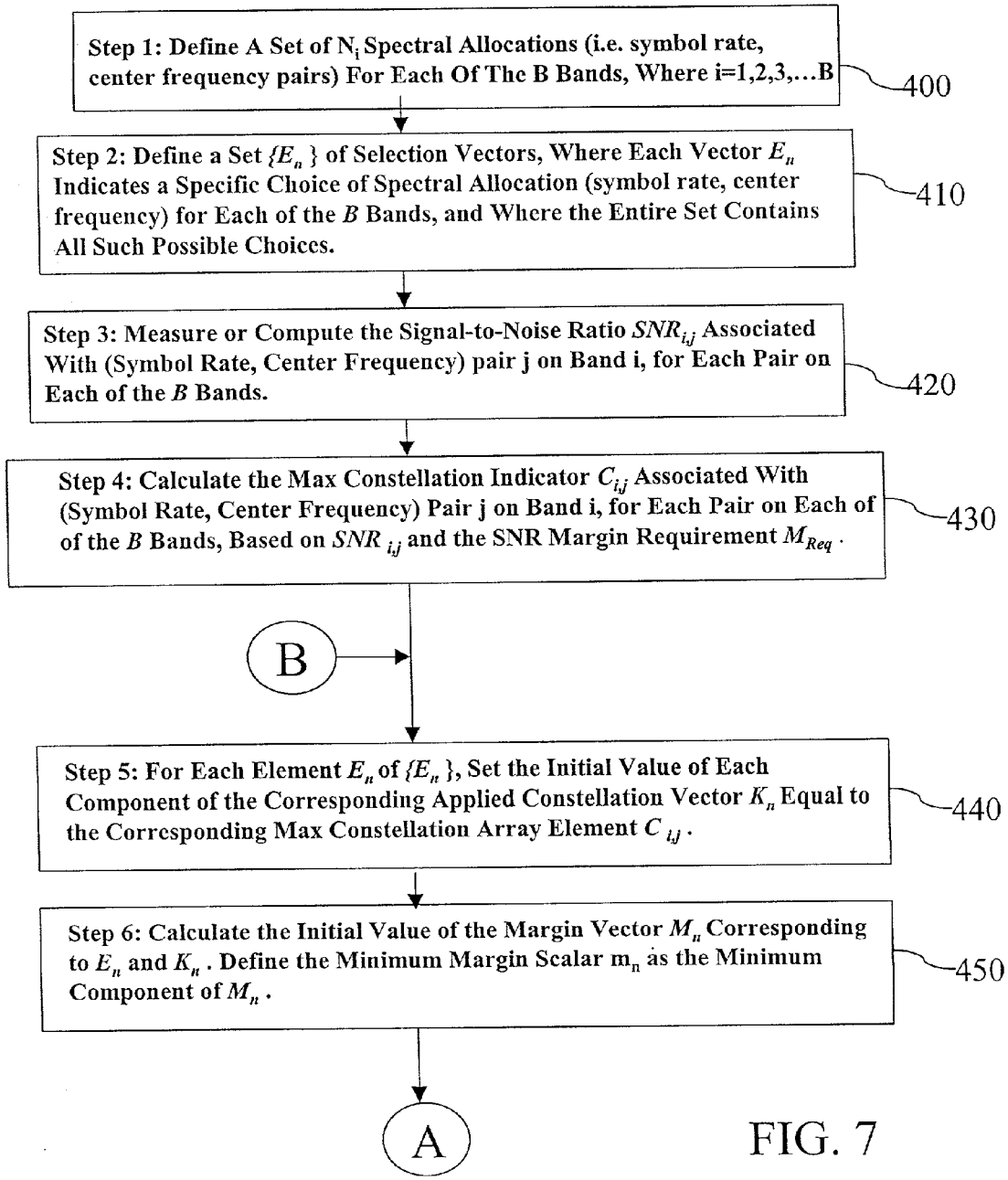
FIGS. 7–10 are flow charts illustrating a method for practicing a single carrier modulation scheme in accordance with an exemplary embodiment of the present invention.
Figure 8:
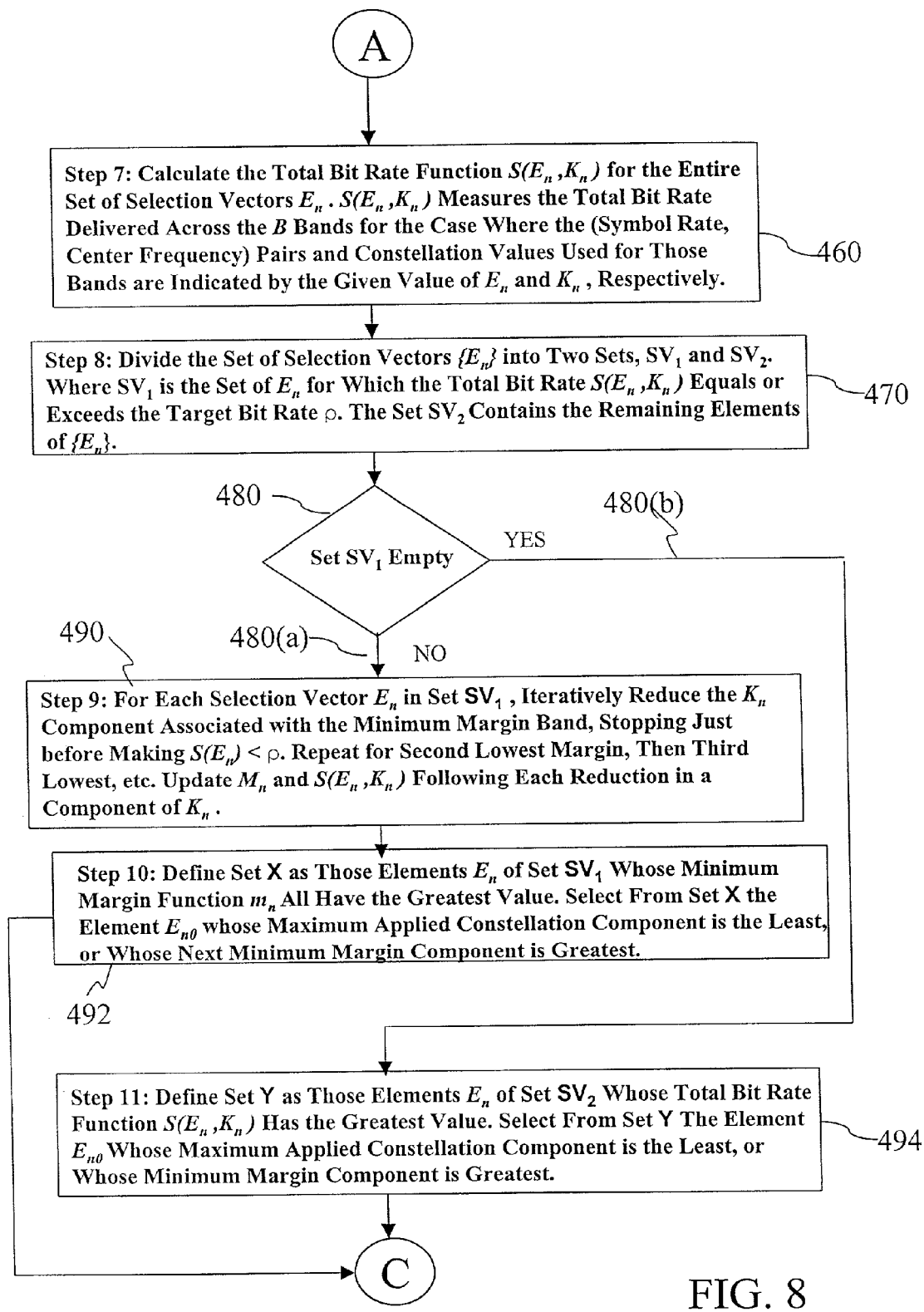
Figure 9:
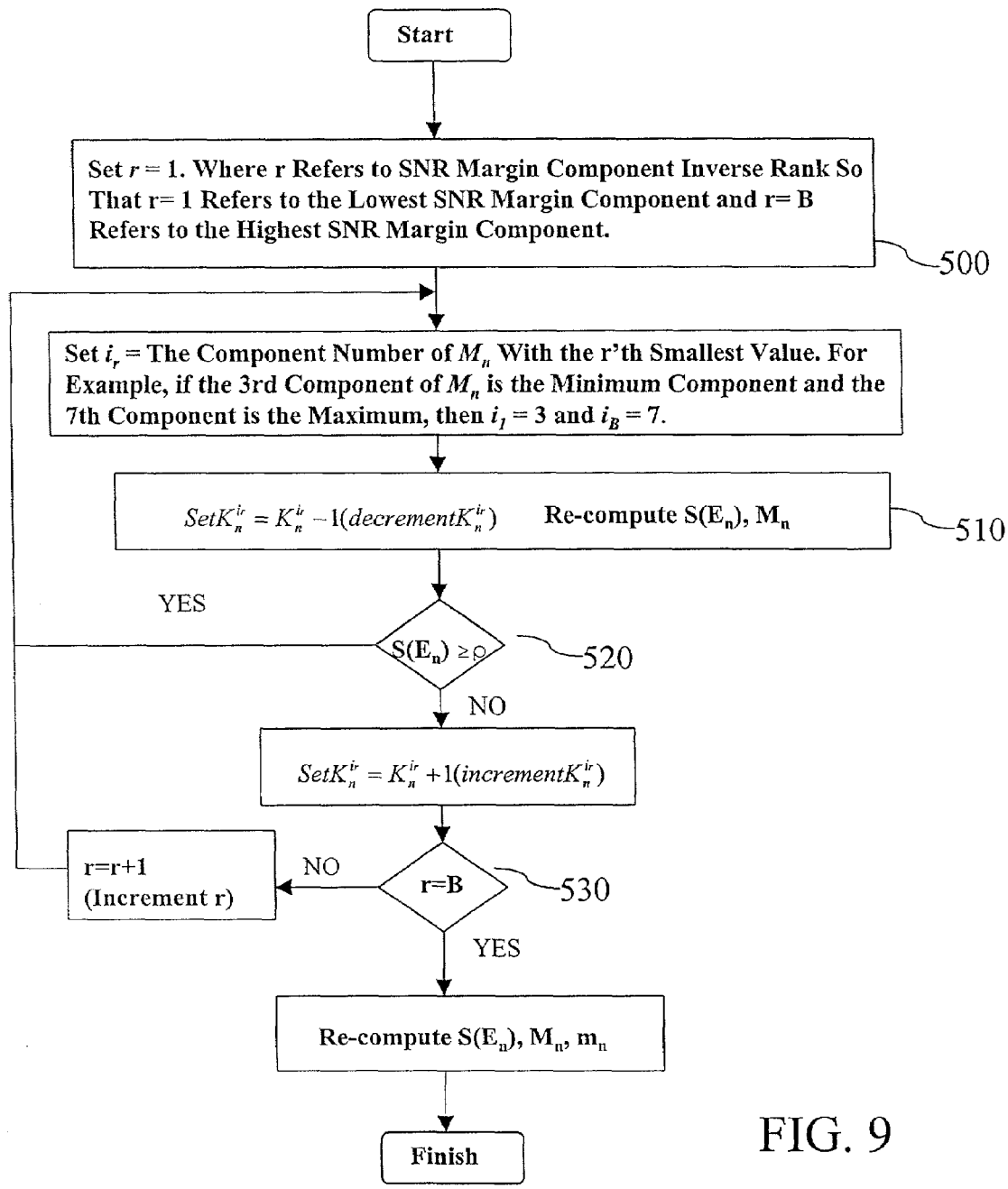

Referring now to FIGS. 7, 8 and 9, simplified flow diagrams illustrate an exemplary method for performing bit rate and/or SNR margin optimization for use in bidirectional communication systems. Briefly, the illustrated method involves "evaluating" certain channel characteristics, such as signal-to-noise-ratio (SNR) or bit error rate (BER) with respect to controlled variations in transmission signal parameter metrics, such as constellation size, spectral allocation, and the like. In accordance with an exemplary embodiment, bit rate and or margin may then be optimized across the multiple bands in accordance with the channel characteristic.

Referring to FIG. 7, in accordance with an exemplary embodiment, a set of Ni spectral allocations (i.e. pairs of symbol rates and center frequencies), where i=1, 2, 3, ... B may be defined for each of the multiple bands (B) 400. The spectral allocations are preferably defined by the user on an application specific basis. In the described exemplary embodiment, the Ni CAP/QAM signals thus produced for the i'th band preferably fit within the frequency range defined for that band. For example, the $N_1$ symbol rate and center frequency pairs defined for the first downstream band in FIG. 1 would all produce a CAP/QAM signal limited in frequency to the range [0.138 MHz, 3.75 MHz].

In the described exemplary embodiment the symbol rate for the j'th (symbol rate, center frequency) pair within the i'th band may be denoted as follows:

$$R_{i,j}, i=1, 2, \ldots B; j=1, 2, \ldots N_1$$

An exemplary embodiment may accommodate the case of no transmission on each band, by extending the symbol rate definition to $R_{i,0}=0$; i=1, 2, ... B. Thus, $R_{i,j}$ is now defined over the subscript range i=1, 2, ... $B_i$; j=0, 1, 2, ... $N_i$, with $R_{i,0}=0$ denoting the case of no transmission on the i'th band.

An exemplary rate adaptation method may now define a set of spectral allocation selection vectors $E_n$, wherein each element of the set is a vector with B components, i.e. one for each of the multiple bands. In the described exemplary embodiment the i'th component takes on an integer value between 0 and $N_i$. In accordance with an exemplary embodiment each selection vector corresponds to a specific symbol rate and center frequency pair for each of the B bands with the pair information for the i'th band assigned to the i'th component of $E_n$. In the described exemplary embodiment the set of selection vectors preferably contains all such possible choices 410. In accordance with an exemplary embodiment, the set of unique selection vectors E= $\{E_n; n=1, 2, \ldots L\}$ therefore contains $$L = \prod_{i=1}^{B} (1 + N_i)$$

elements, with each element differing from every other element in at least one component. Inclusion of the element $E_1$ (no transmission on any band) obviously serves no practical purpose, it merely simplifies an accounting of the elements of E.

The described exemplary rate adaptation method involves measuring or computing a channel characteristic, such as, for example signal-to-noise-ratio (SNR) for each symbol rate/center frequency pair on each band 420. In accordance with an exemplary embodiment, the SNR may be measured, preferably using a relatively convenient and robust modulation technique such as, for example QAM-4. Channel SNR may be measured by one transceiver initiating communication with another, over the channel of interest, and evaluating the resulting SNR at the equalizer decision device. Alternatively, SNR may be calculated from a spectral measurement of the communications channel using any of a number of well known spectral and channel estimation techniques. In accordance with an exemplary embodiment, it may be assumed that the SNR on a given band for a given spectral allocation is independent from, or only weakly influenced by, the choice of spectral allocation on all other bands to reduce the number of links that must be established.

In accordance with an exemplary embodiment, a maximum constellation indicator may now be calculated for each spectral allocation 430. Constellation indicators are equal to the base 2 logarithm of the constellation size which can be supported by the j'th symbol rate/center frequency pair within the i'th band. Potential constellation sizes are based upon a noise margin threshold figure of merit $M_{REQ}$ the measured signal to noise ratio (SNR) for each spectral allocation and the coding gain G (expressed in dB) of the code in use. In the described exemplary embodiment the network operator may define the noise margin threshold figure of merit which is preferably in the range of about 4–6 dB.

For some implementations $C_{i,j}$ may be restricted to a certain subset of the nonnegative integers, such as for example, $C_{i,j} = \epsilon\{1, 2, \ldots 8\}$, while in other implementations certain non-integer values may be added to the set. In accordance with an exemplary embodiment, $C_{i,j}=0$ signifies that the j'th symbol rate/center frequency pair within the i'th band cannot be used to transport any positive amount of data. In accordance with an exemplary embodiment, $C_{i,j}$ may be calculated by first selecting a constellation size from a multiplicity of constellation sizes by a table look-up method. For example, for the case where $C_{i,j} = \epsilon\{1, 2, \ldots 8\}$, $C_{i,j}$ may be determined from the following look-up table.

$$C_{i,j} = \begin{cases} 0, & SNR_{i,j} + G - M_{Req} < 12dB \\ 1, & 12dB \leq SNR_{i,j} + G - M_{Req} < 15dB \\ 2, & 15dB \leq SNR_{i,j} + G - M_{Req} < 19dB \\ 3, & 19dB \leq SNR_{i,j} + G - M_{Req} < 22dB \\ 4, & 22dB \leq SNR_{i,j} + G - M_{Req} < 25dB \\ 5, & 25dB \leq SNR_{i,j} + G - M_{Req} < 28dB \\ 6, & 28dB \leq SNR_{i,j} + G - M_{Req} < 31dB \\ 7, & 31dB \leq SNR_{i,j} + G - M_{Req} < 34dB \\ 8, & 34dB \leq SNR_{i,j} + G - M_{Req} \end{cases}$$

Next, an applied constellation vector $K_n$ defined as the set of constellations that are to be applied across the B bands if the selection vector $E_n$ is chosen for the set of symbol rate/center frequency pairs may now be defined 440. In accordance with an exemplary embodiment, the initial value of the applied constellation vector $K_n$ may be established as follows:

$$K_n^i = C_{i,E_n^i}; i=1, 2, \ldots, B; n=1, 2, \ldots, L$$

The initialization sets each component of each vector $K_n^i$ of each vector $K_n$ equal to the maximum constellation size that can be supported on the i'th band when the symbol rate/center frequency pair used on that band is given by $E_n^i$, where $E_n^i$ is the i'th component of $E_n$.

In accordance with an exemplary embodiment a SNR margin vector $M_n$ corresponding to the symbol rate/center frequency selection vector $E_n$ and applied constellation vector $K_n$ may now be defined. For the case where $C_{i,j}=\epsilon\{1, 2, \ldots 8\}$, with $C_{i,j}$ defined as per above the initial value of the SNR margin vector $M_n$, may be determined in accordance with the following look-up table.

$$M_n^i = \begin{cases} -\infty, & K_n^i = 0 \\ SNR_{i,j} + G - 12dB, & K_n^i = 1 \\ SNR_{i,j} + G - 15dB, & K_n^i = 2 \\ SNR_{i,j} + G - 19dB, & K_n^i = 3 \\ SNR_{i,j} + G - 22dB, & K_n^i = 4 \\ SNR_{i,j} + G - 25dB, & K_n^i = 5 \\ SNR_{i,j} + G - 28dB, & K_n^i = 6 \\ SNR_{i,j} + G - 31dB, & K_n^i = 7 \\ SNR_{i,j} + G - 34dB, & K_n^i = 8 \end{cases}$$

where in this equation $j=E_n^i$.

Next a scalar minimum margin function $m_n$ may be defined for each of the L possible values of the spectral allocation selection vector $E_n$ 450. In accordance with an exemplary embodiment the minimum margin function may be defined as follows:

$$m_n = \min_{1 \leq i \leq B} M_n^i$$

In accordance with an exemplary embodiment, the minimum margin function merely records the minimum SNR margin across all B bands for a given selection vector $E_n$, where by definition $E_n$ is the n'th possible way of selecting a symbol rate, center frequency pair across the B bands.

Next, referring to FIG. 8, the described exemplary embodiment may now define a total bit rate function, $S(E_n,K_n)$, for each of the L possible values of the selection vector $E_n$ 460. The bit rate function indicates the bit rate that would result if a particular constellation were used in combination with the corresponding spectral allocation as follows:

$$S(E_n, K_n) = \sum_{i=1}^{B} R_{i,E_n^i} K_n^i$$

In accordance with an exemplary embodiment the total bit rate function $S(E_n,K_n)$ records the total bit rate across the complete set of B bands for a given value of $E_n$ and $K_n$ where by definition $E_n$ is the n'th possible way of selecting a symbol rate/center frequency pair (i.e. spectral allocation)

across the B bands and $K_n$ is the set of constellations across the B bands corresponding to $E_n$.

The described exemplary rate adaptation method may then compare the bit rate for each spectral allocation/constellation size combination to the desired overall target bit rate ρ. An exemplary embodiment of the present invention may then partition the spectral allocation selection vectors $E_n$ into two sets 470. In one embodiment, the first set of selection vectors ($SV_1$) contains those spectral allocations for which the total bit rate equals or exceeds the target bit rate. Accordingly, the second set of selection vectors ($SV_2$) contains the remaining elements, i.e. the spectral allocations for which the total bit rate is less than the target bit rate.

In accordance with an exemplary embodiment, if one or more spectral allocations provide a total bit rate greater than the target bit rate 480($a$) then the described exemplary embodiment attempts to increase the SNR while maintaining a total bit rate that is greater than or equal to the target bit rate 490. For example, referring to FIG. 9, the described exemplary rate adaptation method inversely ranks the SNR margin components in ascending order where r=1 refers to the lowest SNR margin component and r=B refers to the highest SNR margin component 500. The described exemplary embodiment may then iteratively reduce the component of $K_n$ with the smallest SNR margin 510 until further reduction drops the bit rate below the target bit rate 520.

Following each reduction of a component of $K_n$ the described exemplary embodiment re-computes the total bit rate $S(E_n,K_n)$ and the SNR margin vector $M_n$, corresponding to the spectral allocation selection vector $E_n$. The described exemplary embodiment then repeats this process for the second lowest margin component, then the third lowest margin component, etc 530. When no further reduction in $K_n$ components is possible the next value of $E_n$ is similarly processed.

Returning to FIG. 8, the described exemplary embodiment may now define a subset (X) to include those spectral allocation selection vectors whose total bit rate exceeds or equals the target bit rate and that have the greatest minimum margin function $m_n$ 492. If subset (X) contains more than one element the described exemplary embodiment preferably selects the spectral allocation selection vector (denoted $E_{n0}$) having constellation vector $K_{n0}$ whose maximum component value is the least. Selecting the optimal spectral allocation in accordance with the minimum of the maximum constellation size reflects the fact that, SNR margins being equal, a smaller constellation size tends to provide a more robust solution.

One of skill in the art will appreciate that numerous criteria may be utilized to select the optimum spectral allocation selection vector and constellation vector. For example, an alternative embodiment may distinguish spectral allocations that have equal maximum minimum margin functions on the basis of which spectral allocation has the largest value for the second-lowest margin component. In the very unlikely event that two elements of X both have the greatest first and second-lowest margin components, rate optimization may proceed by continuing on to the third-lowest margin component, etc. Selection of optimum spectral allocation can in fact be made on the basis of numerous other reasonable criteria, such as, for example some mixture of maximum constellation minimization and minimum margin maximization.

If none of the spectral allocations provide a total bit rate that is equal to or greater than the target bit rate 480($b$) an exemplary embodiment of the present invention preferably defines a subset (Y) of spectral allocation selection vectors that have the greatest total bit rate function $S(E_n,K_n)$ 494. If subset (Y) contains more than one element the described exemplary embodiment preferably selects the spectral allocation selection vector (denoted $E_{n0}$) having the constellation selection vector $K_{n0}$ whose maximum component value is the least. As previously discussed smaller constellation sizes tend to provide a more robust solution. In addition, an optimum spectral allocation may also be determined in accordance with alternative criteria such as maximizing the minimum SNR margin, or some hybrid approach, etc.

Figure 10:
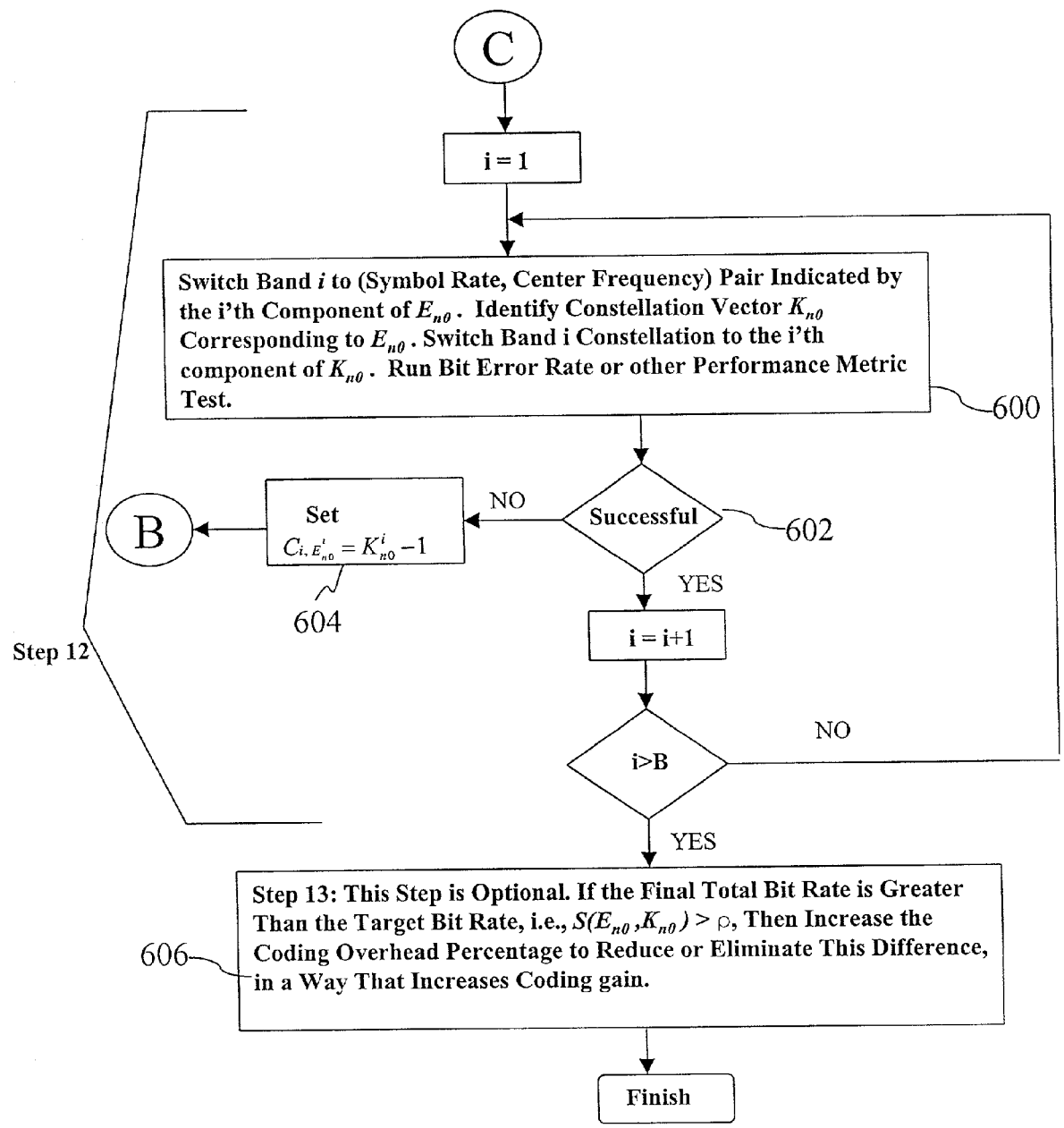

Referring to FIG. 10, an exemplary embodiment of the present invention, instructs the transceiver to switch to the optimized symbol rate/center frequency pair indicated by $E_{n0}$ and to the associated constellation $K_{n0}$ for a particular band 600. An exemplary embodiment of the present invention may then calculate a bit error rate (BER) or other performance metric. This can be done using FEC receiver processing or through the use of known bit sequences embedded in the bit stream. If the bit error rate (BER) test is successful, i.e. less than a predetermined threshold value 602($a$), then the transceiver preferably switches to the optimized symbol rate, center frequency and constellation for the next band and the corresponding performance metric test is executed.

However, if the system cannot establish a link with the specified parameters 602($b$), or if the performance metric test fails, the described exemplary embodiment adjusts the constellation indicator matrix $C_{i,j}$ to reduce the size of the constellation vector 604 and reinitializes the optimization process at step 440 as previously described with respect to FIG. 7. After all of the bands have been successfully switched to their final values and all corresponding performance metric tests passed, then if the final delivered total bit rate is greater than the total target bit rate ρ, the described exemplary embodiment may increase the coding overhead percentage in such a way that this difference is reduced or eliminated, and which in some way increases the performance of the code 606. Following this steady state data communication may commence.

In order to appreciate the advantages of the present invention, it will be beneficial to describe the invention in the context of an exemplary downstream link that uses the two downstream bands shown FIG. 1. The described exemplary rate adaptation method first defines $N_i$ spectral allocations i.e. symbol rate/center frequency pairs for the two downstream bands (B=2). For the purposes of illustration it is assumed here that $N_1=N_2=2$ with the symbol rate and center frequency pairs as illustrated in Table 1.

TABLE 1

| Band Number/ID | Pair Number | Symbol Rate | Center Frequency |
|---|---|---|---|
| 1/Downstream 1 | 1 | 1.89 Mbaud | 2.0925 MHz |
| 1/Downstream 1 | 2 | 2.16 Mbaud | 2.2275 MHz |
| 2/Downstream 2 | 1 | 1.62 Mbaud | 6.5475 MHz |
| 2/Downstream 2 | 2 | 2.16 Mbaud | 6.885 MHz |

The spectral allocations defined in Table 1 lead to the bit rate values $R_{i,j}$ shown in Table 2. Further, for purposes of illustration the signal to noise ratio values, $SNR_{i,j}$ shown in Table 2 are assumed to have been measured for each band in the link. In addition, Table 2 also illustrates the corresponding maximum constellation indicators $C_{i,j}$. In this example, the maximum constellation indicators $C_{i,j}$ reflect an assumed minimum SNR margin requirement of $M_{REQ}=6$ dB, and a coding gain of G= 3.5 dB.

TABLE 2

| i = Band # | j = Pair # | $R_{i,j}$ in Mbaud | $SNR_{i,j}$ in dB | $C_{i,j}$ |
|---|---|---|---|---|
| 1 | 0 | 0 | N/A | N/A |
| 1 | 1 | 1.89 | 34.5 | 7 |
| 1 | 2 | 2.16 | 32.5 | 6 |
| 2 | 0 | 0 | N/A | N/A |
| 2 | 1 | 1.62 | 25.0 | 4 |
| 2 | 2 | 2.16 | 18 | 2 |

The spectral allocation selection vector set $\{E_n\}$, for the current example is illustrated in Table 3 along with the contellation vector $K_n$, signal to noise ratio margin vector $M_n$ and the total bit rate $S(E_n, K_n)$. For purposes of illustration it is assumed for this example that the total target bit rate is equal to 17 Mbps. As seen from Table 3 for this case the described exemplary rate adaptation method selects spectral allocation selection vector $E_8=(2,1)$ with a constellation vector of $K_8=(6,3)$, for a total bit rate of 17.82 Mbps. In processing the described exemplary rate adaptation method reduces the band two component of the constellation vector $K_8$ to increase the SNR margin for that band (and the minimum margin across the two bands) while still providing a bit rate that is larger than the 17 Mbps target bit rate. Following this adjustment to the constellation vector $K_8$, the selection vector $E_8$ is chosen as identifying the optimum spectral allocation because it has the highest minimum margin (7.5 dB) of all the spectral allocations selection vectors that have a total bit rate equal to or greater than the target bit rate.

TABLE 3

| Selection Vector $E_n$ | Constellation Vector $K_n$ | | SNR Margin $M_n$ (dB) | Bit Rate (Mbps) $S(E_n, K_n)$ | Optimum $E_n$, $K_n$ |
|---|---|---|---|---|---|
| | Initially | Reduced | | | |
| $E_1$ = (0, 0) | (0, 0) | (0, 0) | N/A | 0 | No |
| $E_2$ = (0, 1) | (0, 4) | (0, 4) | (N/A, 6.0) | 6.48 | No |
| $E_3$ = (0, 2) | (0, 2) | (0, 2) | (N/A, 6.0) | 4.32 | No |
| $E_4$ = (1, 0) | (7, 0) | (7, 0) | (6.5, N/A) | 13.23 | No |
| $E_5$ = (1, 1) | (7, 4) | (7, 3) | (6.5, 9.0) | 18.09 | No |
| $E_6$ = (1, 2) | (7, 2) | (7, 2) | (6.5, 6.0) | 17.55 | No |
| $E_7$ = (2, 0) | (6, 0) | (6, 0) | (7.5, N/A) | 12.96 | No |
| $E_8$ = (2, 1) | (6, 4) | (6, 3) | (7.5, 9.0) | 17.82 | Yes |
| $E_9$ = (2, 2) | (6, 2) | (6, 2) | (7.5, 6.0) | 17.28 | No |

The described exemplary rate adaptation method identifies the spectral allocation and constellation size to use on each of the multiple bands that results in a total bit rate greater than or equal to the target bit rate, provided it is possible to do so for the channel and subject to the specified constraints on SNR margin and BER limits. If more than one parameter set has this property, the described exemplary embodiment may for example select the spectral allocation and constellation size combination that maximizes the minimum SNR margin across the multiple bands. For cases where the delivered bit rate is greater than the target bit rate, the described exemplary embodiment may reduce the delivered bit rate by increasing the coding overhead to enhance system robustness.

However, there may be applications in which it is not possible to alter the coding overhead percentage and in which it is necessary that the total bit rate delivered by the system be less than or equal to the target bit rate. For example, the speed or data rate of the hardware interface of a communications channel may be limited (i.e. can not exceed the target bit rate) and where the coding parameters are not adjustable. To accommodate such a system, an alternate rate adaptation method may incorporate a method other than that previously illustrated in FIG. 9 to reduce the constellation vectors $K_n$. In all other respects the alternate rate adaptation method is substantially the same as the method previously describe with respect to FIGS. 7–10.

Figure 11:
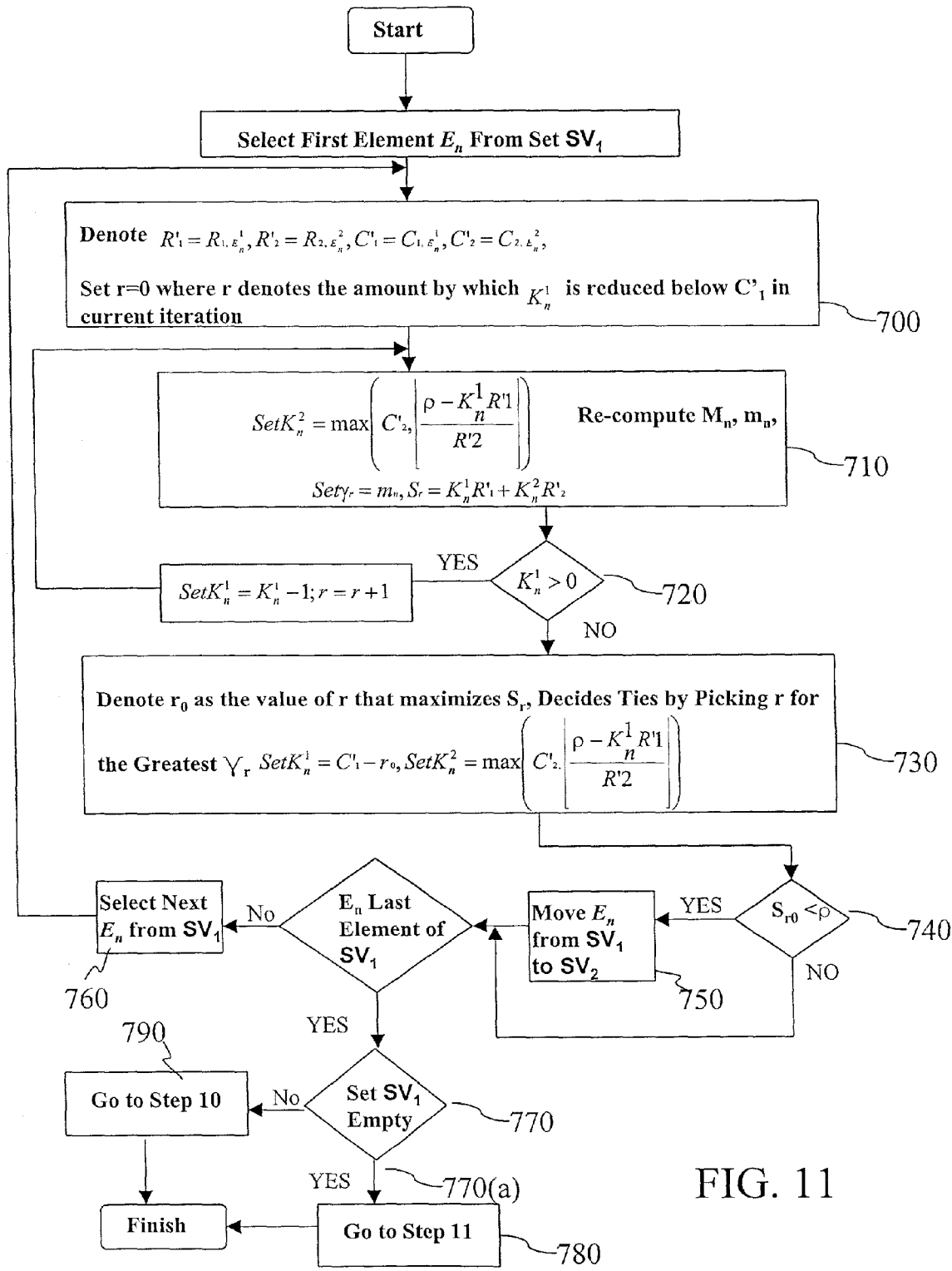
FIG. 11 is an alternative rate optimization method in accordance with an exemplary embodiment of the present invention.

While the alternative approach is generally applicable to transmission systems having any number of bands it will be beneficial to describe the invention in the context of an exemplary system having two bands in a given direction of transmission, i.e., B=2. Referring to FIG. 11, the alternate rate adaptation method also considers the reduction of one or more components of the applied constellation vector $K_n$ for each of the selection vectors whose spectral allocations provide a bit rate equal to or greater than the target bit rate. Initially the value of the constellation vector $K_n$ that corresponds to each value of $E_n$ is defined as follows:

$$K_n^1 = C_{1,E_n^1}; K_n^2 = C_{2,E_n^2}$$

The alternative rate adaptation algorithm may iteratively decrement the constellation vector $K_n^1$ by the amount r, for r=0, 1, 2, . . ., $K_n^1$ 700. For each value of r 710, $K_n^2$ is recomputed so as to produce a bit rate $S_r$ that is as high as possible given the margin-induced limit of $K_n^2 \leq C_{2,E_n^2}$, but that is also less than or equal to the target bit rate (i.e. $S_r \leq \rho$) 720. An exemplary embodiment of the present invention may then select amongst all such values of r the value $r_0$ that yields the greatest bit rate $S_r$ 730. In the event that two or more values of r yield the same maximizing bit rate the alternate adaptation method may select from these r values, the value $r_0$ that provides the largest minimum margin function $m_n$.

The optimization of $r_0$ determines a new constellation vector $K_n$ to be associated with the spectral allocation selection vector $E_n$. In the described alternate embodiment, if the updated constellation vector drops the bit rate $S(E_n, K_n)$ below the target bit rate $\rho$ 740(a), then this selection vector is moved to the second subset containing spectral allocations that provide a total bit rate below the target bit rate 750. After each of the elements of first subsetcontaining spectral allocations that have a bit rate equal to or greater than the target bit rate have been processed in this way the resulting modified set (A) is reconsidered 770. If A is now empty 770(a) the algorithm continues with the optimization process as previously described with respect to step 494 of FIG. 8 780. Otherwise the described exemplary embodiment continues with the optimization process as previously described with respect to step 492 of FIG. 8 790.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method for multi-band, bidirectional data communication over a non-ideal channel using a single CAP/QAM carrier per band, comprising:

defining an adjustable center frequency and constellation size for each of said multiple bands;

defining a total target bit rate for said multiple bands;

defining a margin requirement for each of said multiple bands;

evaluating a response characteristic of each of said multiple bands; and varying the adjustable center frequency and constellation size for defining a combination of an optimum center frequency and an optimum constellation size at which bit rate and/or margin is enhanced in accordance with said response characteristic.

2. The method of claim 1 further comprising the steps of defining a plurality of spectral allocations for each of said multiple bands wherein said response characteristic is evaluated with respect to said plurality of spectral allocations.

3. The method of claim 2 further comprising the step of determining a maximum constellation size for each of said plurality of spectral allocations in accordance with said response characteristic.

4. The method of claim 3 further comprising the step of varying said maximum constellation size to increase a signal-noise-ratio margin without falling below a total target bit rate for said multiple bands.

5. A method for multi-band, bidirectional data communication over a non-ideal channel using a single CAP/QAM carrier per band, comprising:

evaluating a response characteristic of each of said multiple bands with respect to a parametric set;

varying said parametric set by varying a constellation vector including an adjustable center frequency and an adjustable constellation size to increase a signal-noise-ratio margin without falling below a total target bit rate for said multiple bands;

re-evaluating the response characteristic of each of the multiple bands with respect to said varied parametric set; and defining an optimal parametric set for which the response characteristic allows optimization of at least one of said constellation vector and signal-noise-ratio margin.

6. The method according to claim 5, wherein the step of varying the constellation vector further comprises:

varying the constellation vector while maintaining a substantially constant spectral allocation; and repeating the constellation vector varying step at a plurality of different discrete spectral allocations.

7. The method according to claim 5, wherein the step of evaluating a response characteristic of each of said multiple bands with respect to a parametric set comprises evaluating signal-to-noise-ratio.

8. The method according to claim 5 further comprising the step of evaluating said response characteristic with respect to said optimal parametric set.

9. The method according to claim 8 further comprising the step of commencing bidirectional communication with said optimal parametric set if said response characteristic complies with a predetermined threshold.

10. The method according to claim 8 further comprising the step of adjusting said constellation vector in accordance with said response characteristic.

11. A method for multi-band, bidirectional data communication over a non-ideal transmission channel using a single CAP/QAM carrier per band, comprising:

defining an adjustable center frequency for each of said multiple bands;

evaluating a response characteristic of each of said multiple bands with respect to said adjustable center frequencies;

determining a maximum constellation size for each of said adjustable center frequencies in accordance with said response characteristic;

determining total bit rate delivered for each of said adjustable center frequencies and maximum constellation sizes;

varying said maximum constellation sizes to increase signal-noise-ratio margin without falling below a total target bit rate; and defining an optimal center frequency and constellation size in accordance with at least one of said constellation size and signal-noise-ratio margin.

12. A method for multi-band, bidirectional data communication over a non-ideal transmission channel using a single CAP/QAM carrier per band, comprising:

defining an adjustable center frequency for each of said multiple bands;

evaluating a response characteristic of each of said multiple bands with respect to said adjustable center frequency;

determining a maximum constellation size for said adjustable center frequency of each of said multiple bands in accordance with said response characteristic;

determining total bit rate delivered for each of said adjustable center frequencies and maximum constellation sizes; and defining an optimal center frequency and constellation size at which bit rate and/or noise margin is enhanced in accordance with said total bit rate.

13. The method according to claim 12 wherein the step of defining an optimal center frequency and constellation size comprises:

defining a first subset containing center frequency and constellation size combinations for which the total bit rate is equal to or greater than a target bit rate;

varying said plurality of center frequencies within said first subset to increase said noise margin without falling below a total target bit rate for said multiple bands; and defining said optimum center frequency and constellation size in accordance with said increased noise margin.

14. The method according to claim 13 wherein the step of defining said optimum center frequency and constellation size in accordance with said increased noise margin comprises defining optimum center frequency and constellation size in accordance with largest minimum noise margin.

15. The method according to claim 12 wherein the step of defining an optimal center frequency and constellation size comprises:

defining a first subset containing center frequency and constellation size combinations that provide a total bit rate that is less than a target bit rate;

identifying center frequency and constellation size combinations within said first subset that provide largest total bit rate; and defining said optimum center frequency and constellation size in accordance with said noise margin.

16. The method according to claim 12 wherein the step of defining an optimal center frequency and constellation size comprises:

defining a first subset containing center frequency and constellation size combinations for which the total bit rate is equal to or greater than a target bit rate;

varying said center frequencies within said first subset to produce bit rate that is as large as possible but that is also less than or equal to the target bit rate; and defining said optimum center frequency and constellation size in accordance with said noise margin.

17. The method according to claim 16 wherein the step of defining said optimum center frequency and constellation size in accordance with said noise margin comprises defining optimum center frequency and constellation size in accordance with largest minimum noise margin.

18. A method for enhancing a bit rate and/or margin at which communication is performed over multiple bands within a communication link, the method comprising the steps of:

defining a plurality of adjustable center frequencies for each band within said link, wherein each adjustable center frequency relates to a single QAM channel; and defining an optimum combination of one of the defined adjustable center frequencies and a constellation size at which total bit rate and/or margin across said multiple bands is enhanced, wherein each constellation size relates to a single QAM channel.

19. The method according to claim 18 further comprising the steps of:

evaluating a response characteristic of said multiple bands with respect to said center frequencies;

determining a maximum constellation size for each of said center frequencies in accordance with said response characteristic; and determining total bit rate delivered for each of said center frequencies and maximum constellation sizes, wherein said optimum combination of center frequency and constellation size is defined in accordance with said total bit rate.

20. A transceiver for bi-directional communication over a multi-band communication link, comprising a transmit spectrum control circuit for varying an adjustable center frequency with which encoding is performed on said multiple bands; and a transmit constellation size control circuit for varying a constellation size with which encoding is performed on said multiple bands, wherein the transmit spectrum control and transmit constellation size control circuits cooperate to define a combination of center frequency and constellation size at which total bit rate and/or margin is enhanced over said multiple bands.

21. The transceiver as recited in claim 20, wherein the transmit spectrum control circuit is configured to sweep a symbol rate and center frequency of at least one of a downstream channel and an upstream channel in a substantially continuous manner.

22. The transceiver as recited in claim 20, wherein the transmit spectrum control and transmit constellation size control circuits are configured to cooperate to simultaneously vary the constellation size and the center frequency.

23. The transceiver as recited in claim 20, further comprising a receive spectrum control circuit for varying an adjustable center frequency with which decoding is performed on said multiple bands.

24. The transceiver as recited in claim 20, further comprising a receive constellation size control circuit for varying a constellation size with which decoding is performed on said multiple bands.

* * * * *